US010148758B2

(12) United States Patent
Sarisky et al.

(10) Patent No.: US 10,148,758 B2
(45) Date of Patent: Dec. 4, 2018

(54) CONVERGED INFRASTRUCTURE AND ASSOCIATED METHODS THEREOF

(71) Applicant: NETAPP, INC., Sunnyvale, CA (US)

(72) Inventors: Daniel Andrew Sarisky, Cary, NC (US); Dale Holloway, Raleigh, NC (US); Dan Ross Howard, Jr., Apex, NC (US)

(73) Assignee: NETAPP, INC., Sunnyvale, CA (US)

( * ) Notice: Subject to any disclaimer, the term of this patent is extended or adjusted under 35 U.S.C. 154(b) by 0 days.

(21) Appl. No.: 16/016,124

(22) Filed: Jun. 22, 2018

(65) Prior Publication Data

US 2018/0302475 A1    Oct. 18, 2018

Related U.S. Application Data

(63) Continuation of application No. 15/236,013, filed on Aug. 12, 2016, now Pat. No. 10,009,426.

(51) Int. Cl.
| | |
|---|---|
| *G06F 15/16* | (2006.01) |
| *H04L 29/08* | (2006.01) |
| *G06F 3/06* | (2006.01) |
| *H04L 12/24* | (2006.01) |

(52) U.S. Cl.
CPC ........ *H04L 67/1097* (2013.01); *G06F 3/0604* (2013.01); *G06F 3/067* (2013.01); *G06F 3/0619* (2013.01); *G06F 3/0631* (2013.01); *H04L 41/0806* (2013.01)

(58) Field of Classification Search
CPC ............. H04L 67/1097; H04L 41/0806; G06F 3/0604; G06F 3/0619; G06F 3/0631; G06F 3/067
See application file for complete search history.

(56) References Cited

U.S. PATENT DOCUMENTS

| | | | | |
|---|---|---|---|---|
| 6,957,301 | B2 * | 10/2005 | Deenadhayalan | .. G06F 11/1076 711/112 |
| 7,349,960 | B1 * | 3/2008 | Pothier | ............. G06F 17/30539 709/223 |
| 7,849,180 | B2 | 12/2010 | Sawyer et al. | |
| 7,933,979 | B2 * | 4/2011 | Matsune | ................. H04L 63/08 709/220 |

(Continued)

*Primary Examiner* — Moustafa M Meky
(74) *Attorney, Agent, or Firm* — Klein, O'Neill & Singh, LLP

(57) ABSTRACT

Methods and systems for a networked storage environment are provided. One method includes retrieving network access information by a management console to connect to a storage system node in a converged infrastructure (CI) environment with defined configuration requirements for deploying the storage system node that manages a plurality of storage devices; performing an initial determination to ascertain that the storage system node is capable of meeting the CI environment configuration requirements; configuring a plurality of network data ports of the storage system node for sending and receiving data to and from a client system to meet the CI environment configuration requirements; creating an aggregate having storage space at the plurality of storage devices to meet the CI environment configuration requirements for storage devices; and generating a storage volume in compliance with the CI environment configuration requirements.

20 Claims, 14 Drawing Sheets

(56) References Cited

U.S. PATENT DOCUMENTS

| | | |
|---|---|---|
| 8,667,576 B2* | 3/2014 | Lin .................. G06F 21/34 |
| | | 380/30 |
| 9,262,083 B2 | 2/2016 | Gilboa et al. |
| 9,348,646 B1* | 5/2016 | Daya ................ G06F 9/4856 |
| 9,454,306 B2 | 9/2016 | Newby, Jr. et al. |
| 9,507,526 B2 | 11/2016 | Levy et al. |
| 9,740,421 B2 | 8/2017 | Levy et al. |
| 9,798,638 B2 | 10/2017 | Raj et al. |
| 9,830,096 B2 | 11/2017 | Raj et al. |
| 2004/0054849 A1* | 3/2004 | Deenadhayalan .. G06F 11/1076 |
| | | 711/112 |
| 2014/0136829 A1* | 5/2014 | Liang ................ G06F 3/0625 |
| | | 713/2 |
| 2014/0325283 A1 | 10/2014 | Raj |
| 2014/0351539 A1 | 11/2014 | Raj et al. |
| 2016/0019128 A1 | 1/2016 | Raj et al. |
| 2016/0077756 A1 | 3/2016 | Raj et al. |
| 2016/0139815 A1 | 5/2016 | Levy et al. |
| 2017/0038992 A1 | 2/2017 | Levy et al. |

* cited by examiner

US 10,148,758 B2

CONVERGED INFRASTRUCTURE AND ASSOCIATED METHODS THEREOF

CROSS-REFERENCE TO RELATED APPLICATION

This patent application claims priority of and is a continuation of U.S. patent application Ser. No. 15/236,013, filed on Aug. 12, 2016, the disclosure of which is incorporated herein by reference in its entirety.

TECHNICAL FIELD

The present disclosure relates to networked storage environments and more particularly, to configuring one or more storage system nodes for a converged infrastructure environment.

BACKGROUND

Various forms of storage systems are used today. These forms include direct attached storage (DAS) network attached storage (NAS) systems, storage area networks (SANs), and others. Network storage systems are commonly used for a variety of purposes, such as providing multiple users with access to shared data, backing up data and others.

A storage system typically includes at least one computing system executing a storage operating system for storing and retrieving data on behalf of one or more client computing systems ("clients"). The storage operating system stores and manages shared data containers in a set of mass storage devices.

Converged infrastructure environments with compute, networking and storage nodes are becoming useful for data centers. Continuous efforts are being made to efficiently configure and deploy storage nodes in such an environment.

BRIEF DESCRIPTION OF THE DRAWINGS

The foregoing features and other features will now be described with reference to the drawings of the various aspects. In the drawings, the same components have the same reference numerals. The illustrated aspects are intended to illustrate, but not to limit the present disclosure. The drawings include the following Figures.

DETAILED DESCRIPTION

Figure 1A:
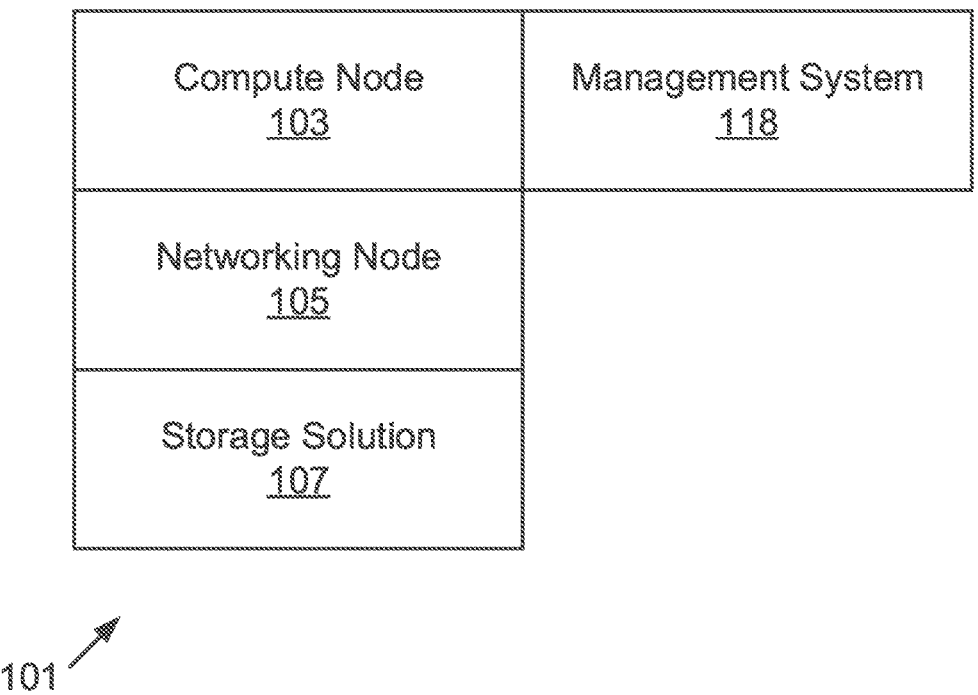
FIG. 1A shows an example of a converged infrastructure, according to one aspect of the present disclosure.

As preliminary note, the terms "component", "module", "system," and the like as used herein are intended to refer to a computer-related entity, either software-executing general purpose processor, hardware, firmware and a combination thereof. For example, a component may be, but is not limited to being, a process running on a processor, a processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device type, in accordance with the claimed subject matter.

In one aspect, a configuration and validation option is provided for a converged infrastructure (CI) environment with compute, networking and storage nodes is provided. A CI environment typically is defined by a reference architecture. To configure a storage system within the CI architecture, users have to use various setup commands using different interface that may be provided by one or more configuration tools. This can be tedious for a data center and may generate unnecessary errors. In one aspect, a single "button" solution is provided that takes a storage system node from node setup to a fully configured CI environment state without having to juggle through different interfaces/tools.

In one aspect, methods and systems for a networked storage environment are provided. One method includes retrieving network access information by a management console to connect to a storage system node in a CI environment with defined configuration requirements for deploying the storage system node that manages a plurality of storage devices; performing an initial determination to ascertain that the storage system node is capable of meeting the CI environment configuration requirements; configuring a plurality of network data ports of the storage system node for sending and receiving data to and from a client system to meet the CI environment configuration requirements; creating an aggregate having storage space at the plurality of storage devices to meet the CI environment configuration requirements for storage devices; and generating a storage volume in compliance with the CI environment configuration requirements.

CI 101:

FIG. 1A shows a high-level block diagram of a CI environment 101 (also referred to as CI 101) that includes a compute node 103, a networking node 105 and a storage solution 107. The CI 101 may also include a management system 118 with a plurality of components that maybe executed by the compute node 103 or by an independent console.

In one aspect, CI 101 provides an integrated computing, networking and storage solution for a data center. The compute node 103 may include one or more servers that execute one or more applications, for example, an email, database or any other application.

The networking node 105 enables the compute node 103 to access the storage solution 107. The networking node 105 at least includes a switch and the storage solution 107 includes a storage system with a plurality of storage devices managed by a storage operating system, as described below in detail.

In one aspect, the CI 101 configuration is validated/certified to meet certain performance and resiliency requirements. This enables data centers to have predictable performance and easy to deploy solutions.

One example, of a CI 101 is FlexPod (without derogation of any third party trademark rights) that are based on servers and switches that are provided by Cisco Systems, Inc. and storage solutions that are provided by NetApp Inc., the assignee of the present application. The various adaptive aspects disclosed herein are not limited to any specific CI or CI configuration.

Figure 1B:
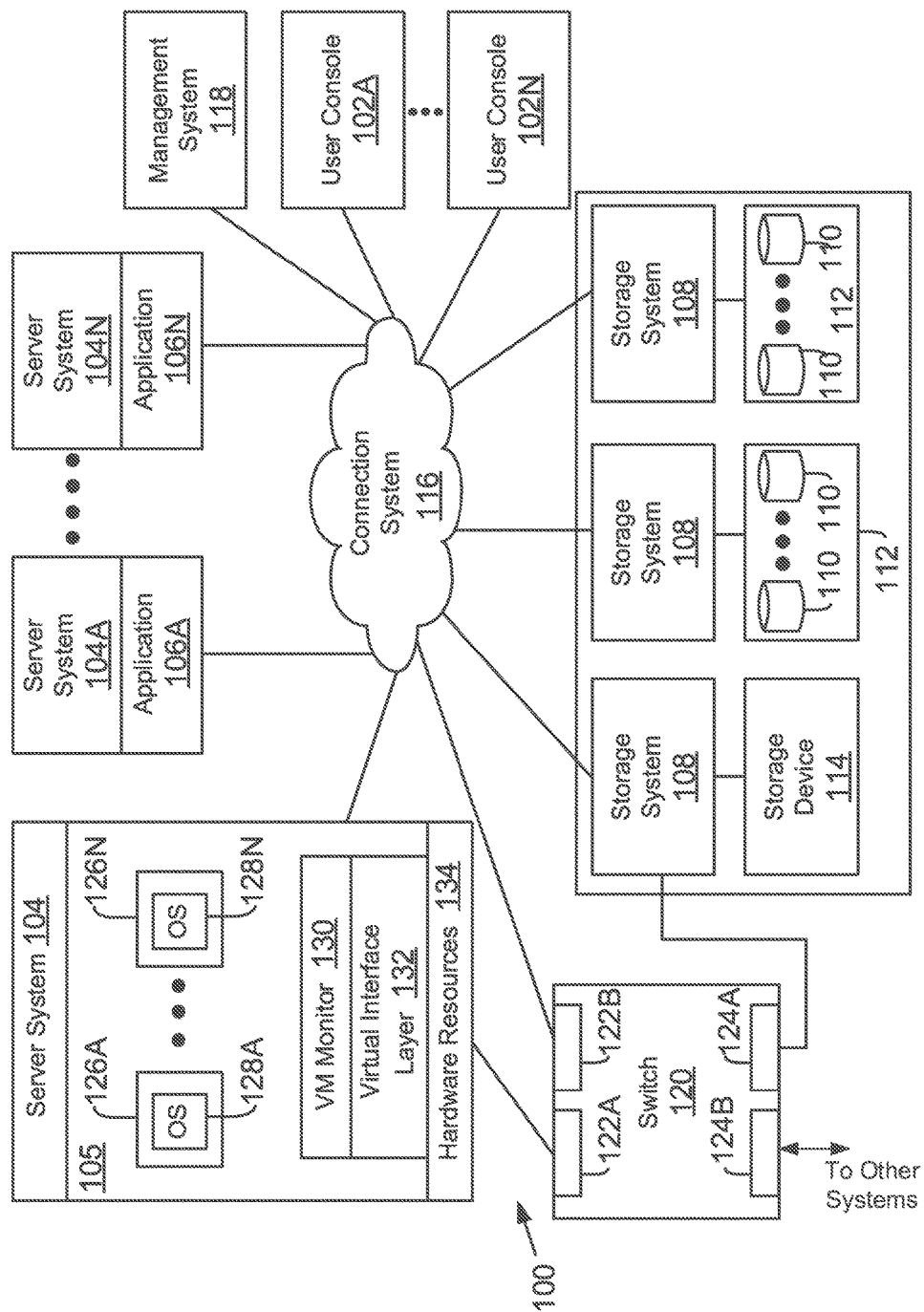
FIG. 1B shows an example of an operating environment for the various aspects disclosed herein.

System 100:

FIG. 1B shows an example of a networked operating environment 100 (also referred to as system 100) with various components that can be used at CI 101, in one aspect of the present disclosure. As an example, system 100 may include one or more computing systems 104A-104N (may also be referred to and also shown as server system 104 or as host system 104) that are part of the compute node 103 of CI 101. The server systems 104 may access one or more storage systems 108 that are part of storage solution 107 via a connection system 116 such as a local area network (LAN), wide area network (WAN), the Internet and others. The server systems 104 may communicate with each other via connection system 116 (part of networking node 105), for example, for working collectively to provide data-access service to user consoles 102A-102N (may be referred to as user 102) and/or to host systems 104.

One or more switch 120 (part of networking node 105) may be used for communication between server systems 104 and storage systems 108/storage device(s) 114. The switch 120 may include a plurality of ports 122A-122B and 124A-124B, having logic and circuitry for handling network packets. For example, port 122A is coupled to host 104, port 122B is coupled to connection system 116 and port 124A is coupled to storage system 108 and port 124B may be coupled to other systems, for example, other switches, respectively. It is noteworthy that although only one port is shown as being connected to the storage system 108, multiple ports may be used for that connection for redundancy or any other reason.

Server systems 104 may be computing devices configured to execute applications 106A-106N (referred to as application or applications 106) over a variety of operating systems, including the UNIX® and Microsoft Windows® operating systems. Applications 106 may utilize data services of storage system 108 to access, store, and manage data in a set of storage devices 110/114 that are described below in detail. Applications 106 may include an email exchange application, a database application or any other type of application. In another aspect, application 106 may comprise a virtual machine as described below in more detail.

Server systems 104 generally utilize file-based access protocols when accessing information (in the form of files and directories) over a network attached storage (NAS)-based network. Alternatively, server systems 104 may use block-based access protocols, for example, the Small Computer Systems Interface (SCSI) protocol encapsulated over TCP (iSCSI) and SCSI encapsulated over Fibre Channel (FCP) to access storage via a storage area network (SAN).

Server 104 may also execute a virtual machine environment 105, according to one aspect. In the virtual machine environment 105 a physical resource is time-shared among a plurality of independently operating processor executable virtual machines (VMs). Each VM may function as a self-contained platform, running its own operating system (OS) and computer executable, application software. The computer executable instructions running in a VM may be collectively referred to herein as "guest software". In addition, resources available within the VM may be referred to herein as "guest resources".

The guest software expects to operate as if it were running on a dedicated computer rather than in a VM. That is, the guest software expects to control various events and have access to hardware resources on a physical computing system (may also be referred to as a host platform) which maybe referred to herein as "host hardware resources". The host hardware resource may include one or more processors, resources resident on the processors (e.g., control registers, caches and others), memory (instructions residing in memory, e.g., descriptor tables), and other resources (e.g., input/output devices, host attached storage, network attached storage or other like storage) that reside in a physical machine or are coupled to the host platform.

The virtual execution environment 105 executes a plurality of VMs 126A-126N. VMs 126A-126N execute a plurality of guest OS 128A-128N (may also be referred to as guest OS 128) that share hardware resources 134. As described above, hardware resources 134 may include CPU, memory, I/O devices, storage or any other hardware resource.

A virtual machine monitor (VMM) 130, for example, a processor executed hypervisor layer provided by VMWare Inc., Hyper-V layer provided by Microsoft Corporation (without derogation of any third party trademark rights) or any other layer type, presents and manages the plurality of guest OS 128A-128N. VMM 130 may include or interface with a virtualization layer (VIL) 132 that provides one or more virtualized hardware resource 134 to each guest OS. For example, VIL 132 presents physical storage at storage devices 110/114 as virtual storage (for example, as a virtual hard drive (VHD)) to VMs 126A-126N. The VMs use the VHDs to store information at storage devices 110/114.

In one aspect, VMM 130 is executed by server system 104 with VMs 126A-126N. In another aspect, VMM 130 may be executed by an independent stand-alone computing system, often referred to as a hypervisor server or VMM server and VMs 126A-126N are presented via another computing system. It is noteworthy that various vendors provide virtualization environments, for example, VMware Corporation, Microsoft Corporation (without derogation of any third party trademark rights) and others. The generic virtualization environment described above with respect to FIG. 1A may be customized depending on the virtual environment provider.

System 100 may also include the management system 118 for managing and configuring various elements of system 100. Management system 118 may include one or more computing systems for performing various tasks described below in detail. Details regarding management system 118 are provided below in more detail.

System 100 may also include one or more user consoles 102A-102N referred to as users. Users' 102A-102N may access server system 104 for storage related services provided by storage system 108 and also use management system 118 described below in detail.

In one aspect, storage system 108 includes one or more nodes with access to a set of mass storage devices 110 (may be referred to as storage devices 110) within a storage subsystem 112. Storage system 108 may also access storage devices 114 via another switch (not shown) that may be a Fibre Channel, Fibre Channel over Ethernet or any other type of switch. Storage devices 110 and 114 are referenced interchangeably throughout this specification. As an example, storage devices 110 and 114 may be a part of a storage array within the storage sub-system.

Storage devices 110/114 are used by storage system 108 for storing information. The storage devices 110/114 may include writable storage device media such as magnetic disks, video tape, optical, DVD, magnetic tape, non-volatile memory devices for example, self-encrypting drives, flash memory devices and any other similar media adapted to store information. The storage devices 110/114 may be organized as one or more groups of Redundant Array of Independent (or Inexpensive) Disks (RAID). The aspects disclosed herein are not limited to any particular storage device or storage device configuration.

In one aspect, to facilitate access to storage devices 110/114, a storage operating system of storage system 108 "virtualizes" the storage space provided by storage devices 110/114. The storage system 108 can present or export data stored at storage devices 110/114 to server systems 104 and VMM 130 as a storage volume or one or more qtree sub-volume units. Each storage volume may be configured to store data files (or data containers or data objects), scripts, word processing documents, executable programs, and any other type of structured or unstructured data. From the perspective of the VMs/server systems, each volume can appear to be a single disk drive. However, each volume can represent the storage space in one disk, an aggregate of some or all of the storage space in multiple disks, a RAID group, or any other suitable set of storage space. The term aggregate as used herein means a logical object for managing storage space at one or more physical storage devices.

It is noteworthy that the term "disk" as used herein is intended to mean any storage device/space and not to limit the adaptive aspects to any particular type of storage device, for example, hard disks.

The storage system 108 may be used to store and manage information at storage devices 110/114 based on a request generated by server system 104, management system 118, user 102 and/or a VM. The request may be based on file-based access protocols, for example, the CIFS or the NFS protocol, over TCP/IP. Alternatively, the request may use block-based access protocols, for example, iSCSI or FCP.

As an example, in a typical mode of operation, server system 104 (or VMs 126A-126N) transmits one or more input/output (I/O) commands, such as an NFS or CIFS request, over connection system 116 to the storage system 108. Storage system 108 receives the request, issues one or more I/O commands to storage devices 110/114 to read or write the data on behalf of the server system 104, and issues an NFS or CIFS response containing the requested data over the connection system 116 to the respective server system 104

In one aspect, storage system 108 may have a distributed architecture, for example, a cluster based system that may include a separate network module and storage module, described below in detail with respect to FIG. 2A. Briefly, the network module is used to communicate with host platform server system 104 and management system 118, while the storage module is used to communicate with the storage devices 110/114 that are a part of a storage sub-system.

Storage system 108 maintains various data structures for storing information related to storage devices 110/114. For example, storage system 108 is aware of the identity and capabilities of storage device 110/114. Storage system 108 maintains the information regarding all the VMs and server systems that use storage device 110/114. This information may be provided to the management system 118 for configuring a storage system to a CI environment, as described below in detail.

Figure 1C:
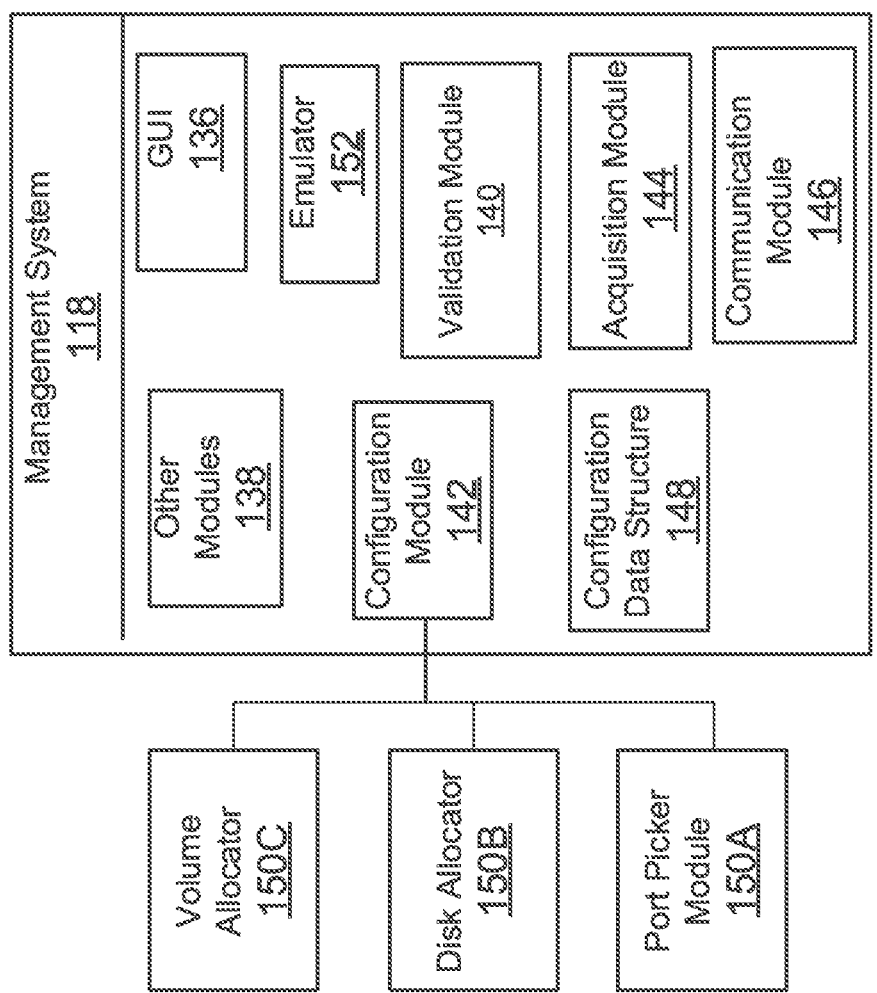
FIG. 1C shows an example of a management system, according to one aspect of the present disclosure.

Management System 118:

FIG. 1C shows a block diagram of management system 118 having a plurality of modules, according to one aspect. The various modules of the management system 118 may be implemented in one computing device or in a distributed environment among multiple computing systems. In one aspect, the management system 118 is used to configure a storage system or storage system node to a certified, CI configuration via a single button presented by a GUI, as described below in detail.

In one aspect, the management system 118 executes a series of validation commands to ensure that a storage system complies with CI environment configuration requirements. The validation commands may be run in sequence. The commands provide a description of itself and determine if the constraints for the command are met. If the constraints are not met, then a description is provided of why they are not met and an option to "fix" the constraints may also be provided.

In the illustrated aspects, the management system 118 may include a graphical user interface (GUI) module 136 to generate a GUI for displaying information and receiving inputs. The GUI may also present a "single button" for configuring a storage system node, as described below in detail. In another aspect, management system 118 may present a command line interface (CLI) for receiving inputs. In addition to providing a GUI and CLI, the management system 118 provides a programmatic interface that is API (application programming interface (API) driven. This is especially useful in the evolving software defined storage (SDS) environments. SDS enables policy-based provisioning and management of data storage independent of the underlying hardware. SDS definitions typically separate the storage hardware from the software that manages the storage infrastructure.

Management system 118 may include a communication module 146 that implements one or more conventional communication protocols and/or APIs to communicate with the storage system 108, switch 120, servers 104 and other devices.

In one aspect, the management system 118 further includes an acquisition module 144 that obtains information regarding storage devices 110/114 from storage system 108 and other resources of system 100. Acquisition module 144 may send a discovery request to obtain configuration information. The format and structure of the discovery request will depend on the protocol/standard used by acquisition module 144 to communicate with storage system 108, switch 120 and any other resource. The adaptive aspects described herein are not limited to any specific discovery request format.

Management system 118 further includes a processor executable configuration module 142 that stores configuration information in a configuration data structure (may be referred to as data structure) 148 for a CI compliant system.

Data structure 148 may include one or more data structures that store information for CI compliance and certification. For example, data structure 148 may store information regarding the compute node 103, the networking node 105 and the storage solution 107, which is used to configure and convert a storage system node to a CI compliant and certified system, as described below in detail.

As an example, data structure 148 stores a name of a storage device manufacturer, a storage device identifier, a maximum number of IOPS that the device can handle and a throughput rate that the storage device is able to support.

Data structure 148 also identifies the storage system 108 that manages a storage device, the storage volumes associated with the storage device and the identity of users (for example, server systems 104) that access the storage volumes.

Data structure 148, may also identify the switch 120 used by system 100, the various ports of switch and the identity of the devices/computing systems that are coupled to the switch. This information is acquired by acquisition module 144 either directly from the switch or any other entity, according to one aspect.

Data structure 148 may also identify the VMM 130, for example, the hypervisor that presents and controls VMs 126A-126N; the various VMs and the resources that are used by the VMs at any given time, for example, VHDs. This information may also be acquired by acquisition module 144 from VMM 130 and storage system 108.

In one aspect, to configure a storage system node to a CI defined configuration, the configuration module 142 uses a port picker module 150A, a disk allocator 150B and a volume allocator 150C that are described below in detail.

Management system 118 further includes a validation module 140 that validates a particular configuration for the CI environment using a single button, as described below in detail.

Management system 118 may also include an emulator 152 that is used to emulate a CI environment to provide feedback to a user whether a given set of components or one components can be certified for a CI. Details of emulator 152 are provided below.

Management system 118 may also include other modules 138. The other modules 138 are not described in detail since they are not germane to the inventive aspects.

Figure 1D:
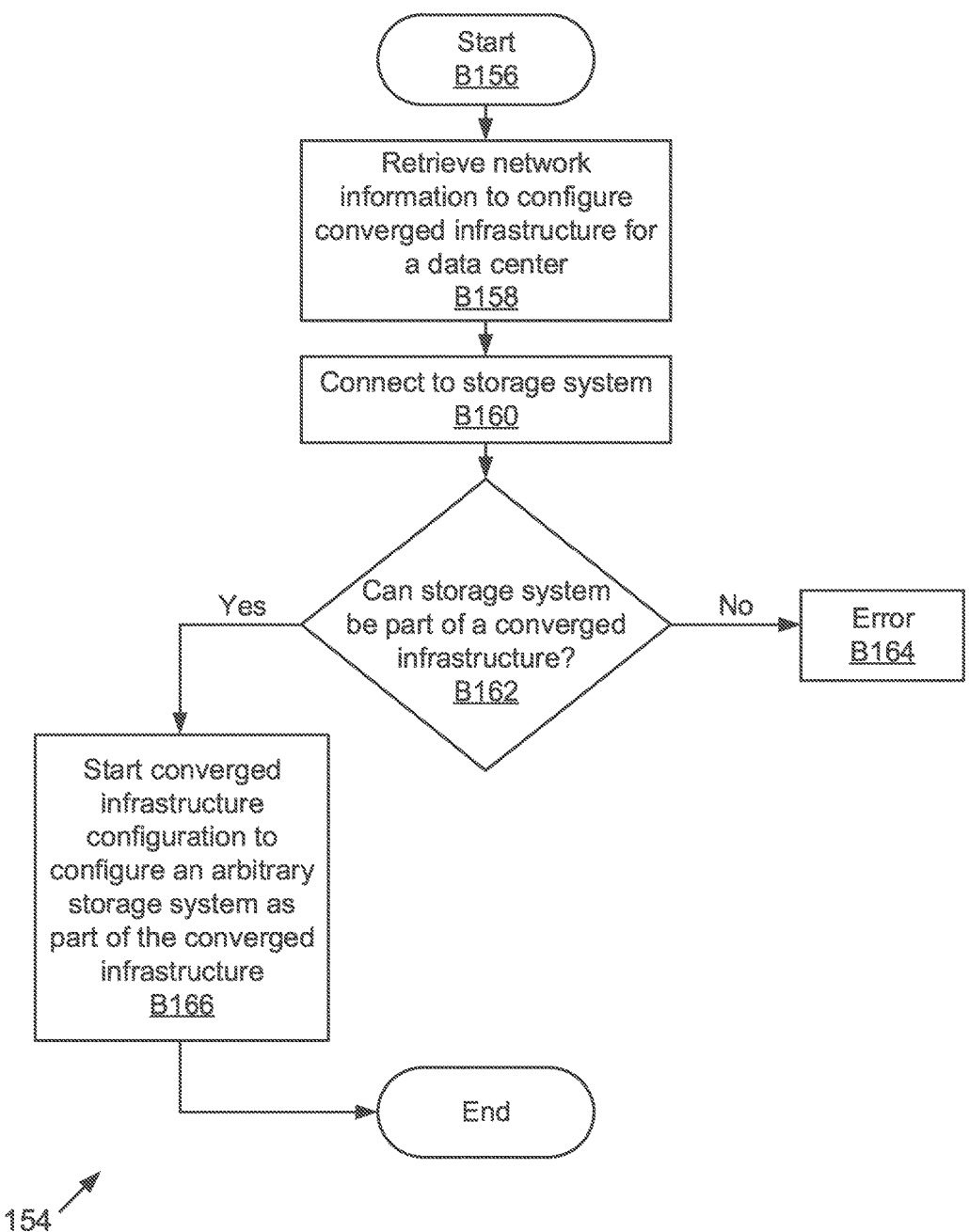
FIGS. 1D-1K shows examples of various process flow diagrams, according to various aspects of the present disclosure.

Process Flows:

FIG. 1D shows a high level process 154 for converting an arbitrary storage system node to a defined CI configuration using a single button, according to one aspect of the present disclosure. The storage system node may be a storage server provided by the assignee of this application or any other vendor.

The process begins in block B156, when at least the compute node 103 (for example, server 104, FIG. 1B), the networking node 105 (for example, switch 120, FIG. 1B) and the storage solution 107 (for example, storage system 108, FIG. 1B) are available for use. The storage system may be configured/converted using the configuration module 142 of the management system 118.

In block B158, network information is retrieved to configure the storage system 108 for a CI configuration. The network information may be retrieved from data structure 148 or input via a user interface. The network information may include a network access address (for example, an IP address), a network gateway identifier and a root name. In one aspect, the network information is used to connect to the storage system 108.

In block B160, the management system 118 connects to the storage system 108. In one aspect, the communication module 146 connects to the storage system 108. In block B162, the configuration module 142 determines if the basic configuration of the storage system 108 meets the configuration requirements for a CI system. The configuration requirements may be stored in data structure 148. For example, the configuration requirements may state that the storage solution 107 has to provide a certain number of non-broken spare disks per storage device shelf; network flow control has to be disabled, a cabled management port and two cabled data capable ports has to be provided and all cluster interconnect ports described below with respect to FIGS. 2A-2B are cabled appropriately to a switch or to another node of the clustered storage system. The adaptive aspects provided herein are not limited to any specific configuration example.

If the initial check fails, then in block B164, an error message is generated.

If the storage system 108 configuration meets the basic CI configuration information, then the configuration process begins on block B166 that is described below in more detail with respect to FIG. 1E. In one aspect, a user is provided with a single "button click" experience to convert an arbitrary storage system node into a certified CI system without having to go through multiple configuration tools/screens/commands. This saves time and is efficient in a data center that has numerous components.

Figure 1E:
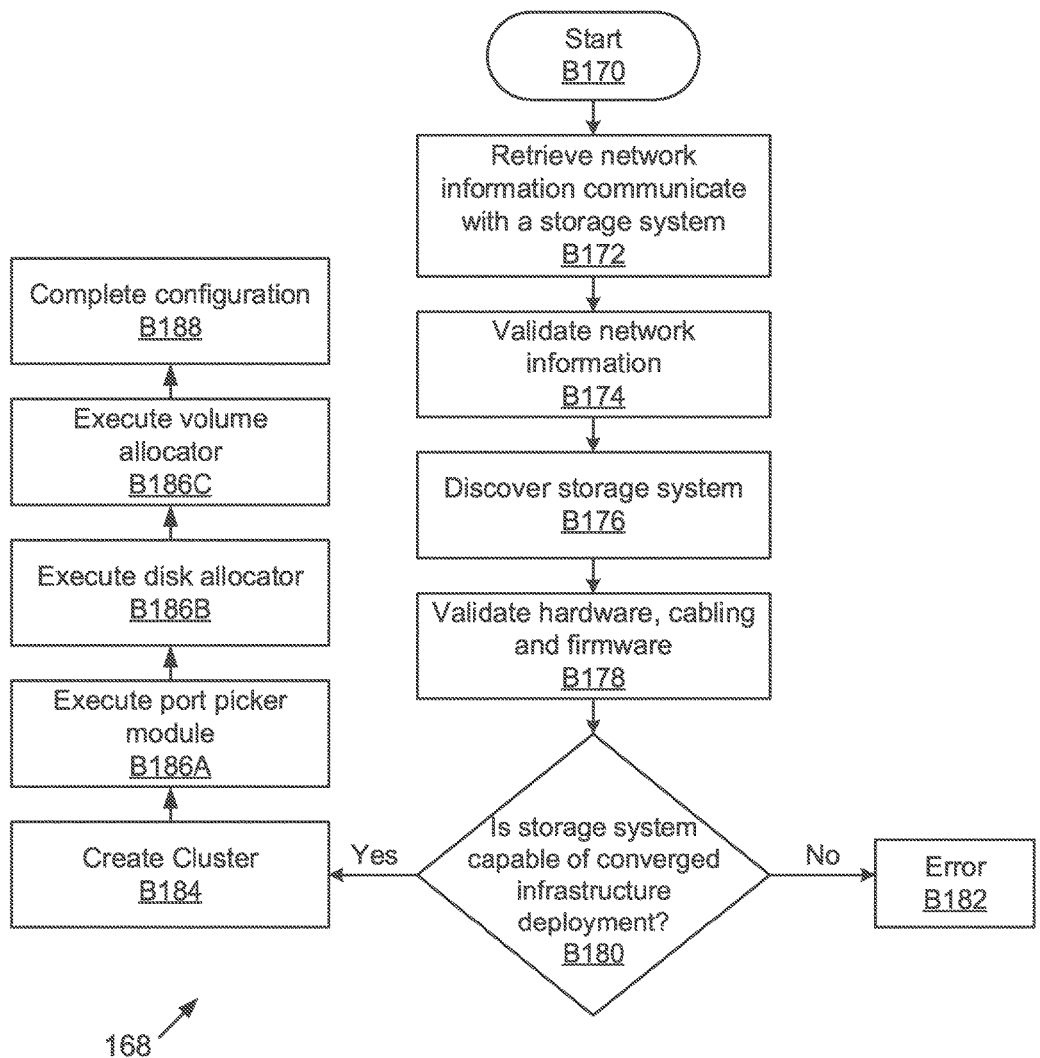

FIG. 1E shows a process 168, with details of block B166, according to one aspect of the present disclosure. The process begins in block B170, when a storage system 108 node is selected for a CI configuration.

In block B172, network information to connect to the storage system 108 is retrieved. This enables the management system 118 to communicate with the storage system 108 via the communication module 146.

In block B174, the validation module 140 validates the retrieved network information. In one aspect, the process ensures that there are enough network addresses (for example, IP addresses) for communication, and the subnet and gateway identifiers match a naming convention. After validation, in block B174, the storage system 108 hardware is discovered. In block B178, the hardware is validated. For example, the process verifies that a certain number of non-broken spare disks per storage device shelf are being provided; network flow control is disabled, a cabled management port and two cabled data capable ports are available and all cluster interconnect ports are cabled appropriately to a switch or to another node of the clustered storage system. The process ensures that all the proper cabling is installed. The cabling information may be stored as part of the configuration data 148. The firmware for the storage system 108 is also validated.

After the validation, the process determines if the storage system 108 can be deployed within the CI environment as a CI certified system. In one aspect, this determination is made as a preliminary check where stored CI configuration information is compared with the storage system information. For example, the process may determine if there is incorrect cabling, outdated storage system 108, outdated firmware for network devices and servers or any other parameter. If not, an error is generated in block B182.

If yes, then in block B184, a cluster is created (described below in detail with respect to FIG. 2A). The cluster is uniquely identified and the users of the storage system are created. Proper software licenses are applied to the cluster so that the users can use the system. Thereafter, the process executes the port picker module 150A in block B186A that is described below with respect to FIG. 1F, the disk allocator 150B in block B186B, described below with respect to FIG. 1G, and the volume allocator module 150C is executed in block B186C described below with respect to FIG. 1H. Thereafter, the configuration is completed in block B188.

Figure 1F:
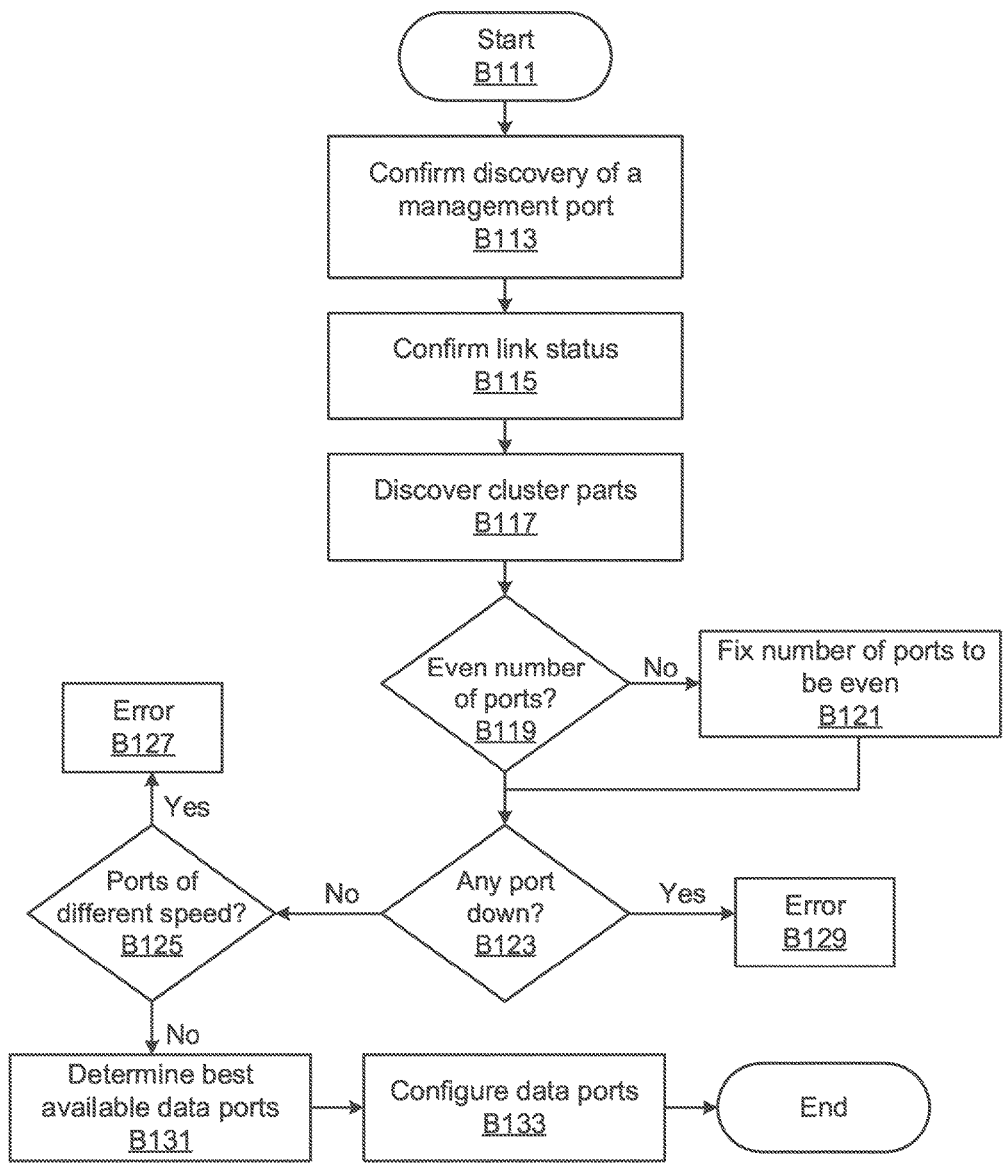

FIG. 1F shows process B186A for executing the port picker module 150A, according to one aspect of the present disclosure. The port picker module 150A is used to configure network ports of the storage system 108 to comply with a CI configuration. The network ports at the storage system are located at one or more network adapters that communicate with servers 104 as described below with respect to FIG. 2B. In one aspect, the storage system 108 uses dedicated ports for sending and receiving data for input/output requests and these ports are referred to as data ports. The storage system 108 also uses one or more dedicated management ports that are used to receive management commands and provide management commands related information. The management commands maybe used to setup a parameter or receive status information.

In one aspect, the port picker module 150A assists in determining what ports to use for management, how many and what ports to use as data ports; whether there are any cabling violations and other functions.

The process begins in block B111 when the port picker module 150A starts executing. In block B113, the various ports of the storage system 108 are discovered. The discovery may be conducted by sending out discovery packets to the various ports and then receiving a response. The discovery is used to confirm that the management port has been discovered.

In block B115, the process confirms that a network link to the storage system 108 is operational. If the network link is not functional then an error may be generated.

If the network link is operational, then in block B117, all the data ports for a cluster are discovered, when the storage system node is operating within the cluster. As described below in detail, a cluster may have more than one storage system node. The cluster data ports are the ports that a client system uses to communicate with the cluster/node for accessing storage.

In block B119, the process discovers if there are an even number of discovered ports. If not, the process tries to trouble shoot to ensure that there are an even number of ports. If the process fails to have an even number of ports, then an error is generated. For an even number of ports, in block B123, the process determines if any of the ports are down. If yes, then an error is generated in block B129. If not, then in block B125, the process determines if any of the ports have different operating speeds. This information again may be obtained from the network adapters of the storage system nodes. If yes, then an error is generated in block B127. If not, then in block B131, the best available data ports are selected for the CI configuration. To select the best data ports, the process finds all data capable ports. Depending on the operating speeds, the data ports are ordered by speed and the ports with the highest speed are selected. Thereafter, in block B133, the selected ports are configured for best practices for the CI configuration. This may include disabling TCP flow control, setting up a maximum transmission unit (MTU) size and other parameters. Thereafter, the process ends.

Figure 1G:
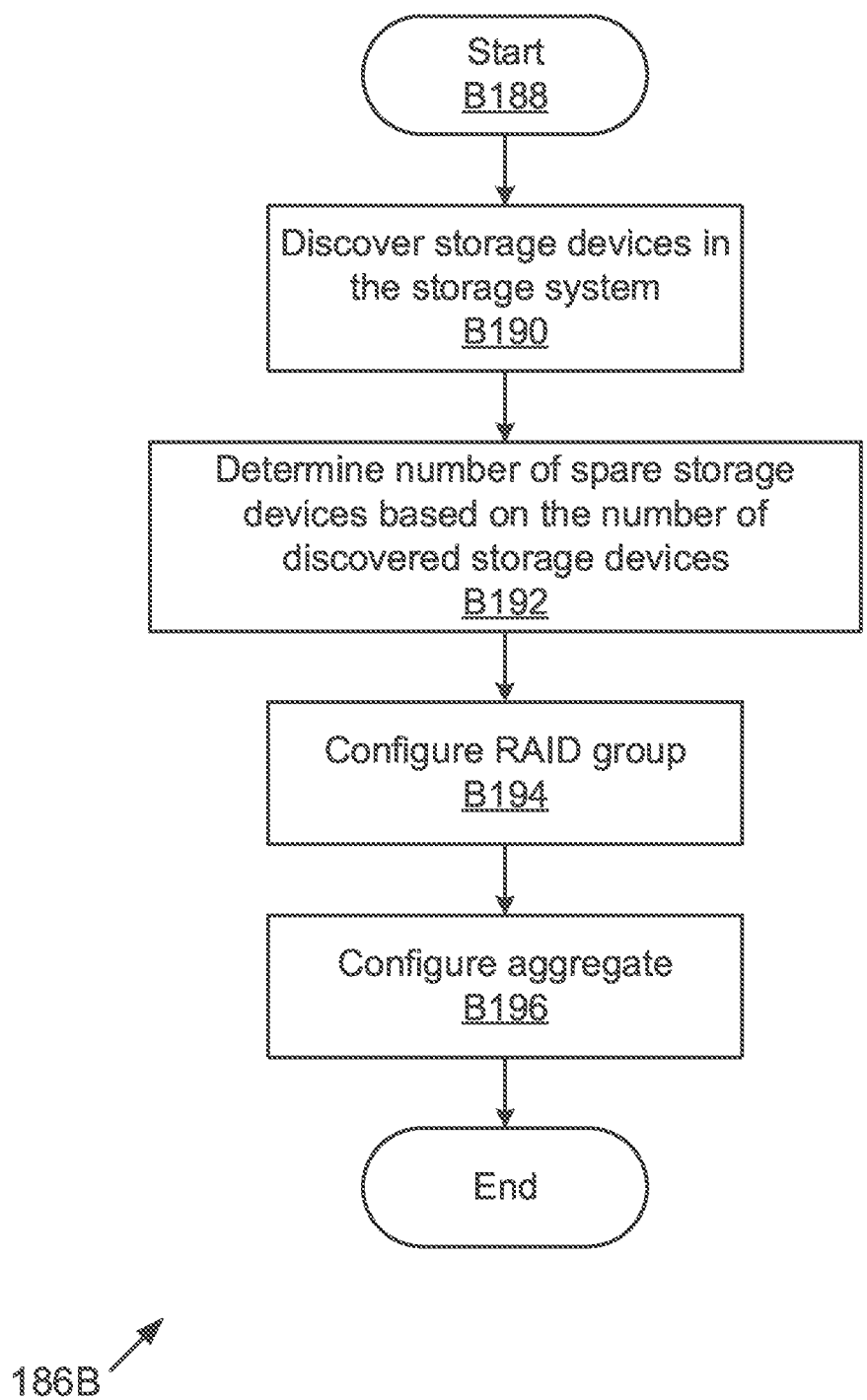

FIG. 1G shows a process for executing block B186B of FIG. 1E, according to one aspect of the present disclosure. The process begins in block B188 and is executed by the disk allocator module 186B. The disk allocator 150B is designed to determine how many devices are to be used for spares, how to divide device ownership, number of aggregates for data disks, configure RAID groups and how to manage and handle broken disks.

In block B190, all the storage devices of the storage system 108 and the storage device type are discovered, for example, hard disk drives and solid state drives (SSDs). In block B192, the disk allocator 186B determines the number of spare storage devices that will be needed based on the total storage device count. The number of spare devices may be part of the CI configuration. For example, if the number of storage devices is less than 8, then no spare storage device maybe used, if the number is between 8-24, then two of the storage devices maybe used as spares, when the number of storage devices is between 24-120, then four storage devices may be used as spares and when the number of storage devices is greater than 120, then 13 storage devices may be used as spares. In one aspect, if there are any broken storage devices, then the broken storage devices may be used as spares, as long as the number of broken storage devices does not exceed a threshold value.

Thereafter, in block B194, a RAID group is configured and in block B196, an aggregate is established for the RAID groups. The best practices for the CI configuration are applied to the storage devices, based on device type. The best practices information may be part of data structure 148.

Figure 1H:
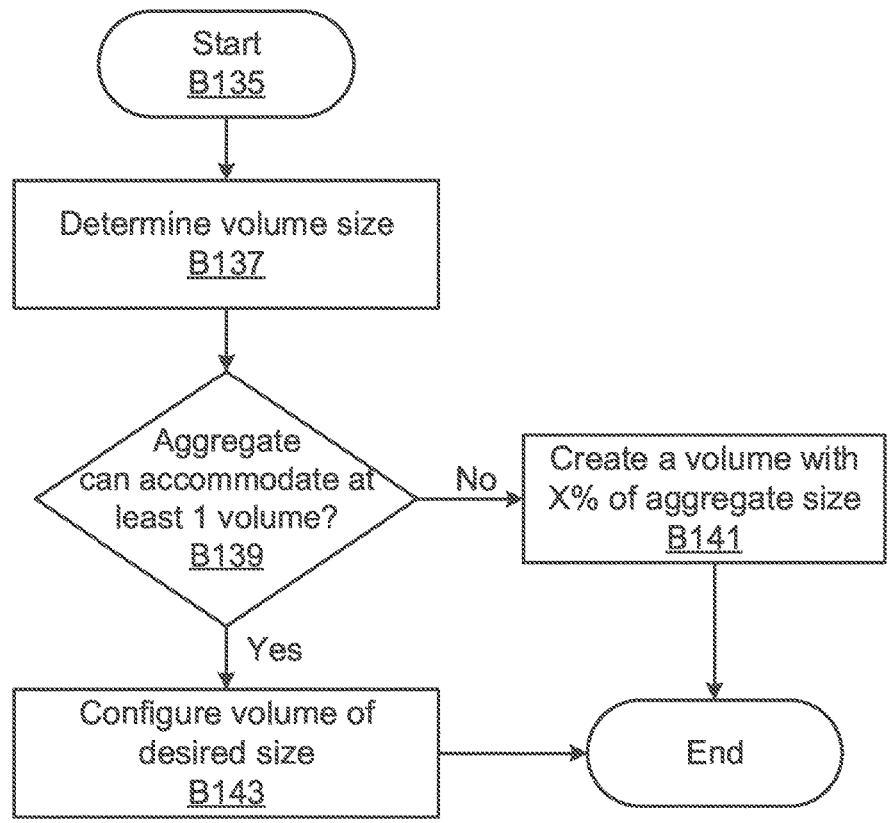

FIG. 1H shows details of process block B186C (FIG. 1E) executed by the volume allocator 150C, according to one aspect of the present disclosure. The volume allocator 150C is configured to determine the size and number of volumes that can be generated for a user.

The process begins in block B135. In block B137, a volume size is determined. The volume size may be based on user input or may have a default size for the CI configuration. In block B139, the process determines if the aggregate can accommodate the volume size. If not, then in block B141, a volume that may be certain percentage of the aggregate size, for example, 90%, may be created. If yes, then in block B143, the desired volume size is created and best practices may be applied to the created volume. The created volume is certified to meet the CI configuration requirements.

Figure 1I:
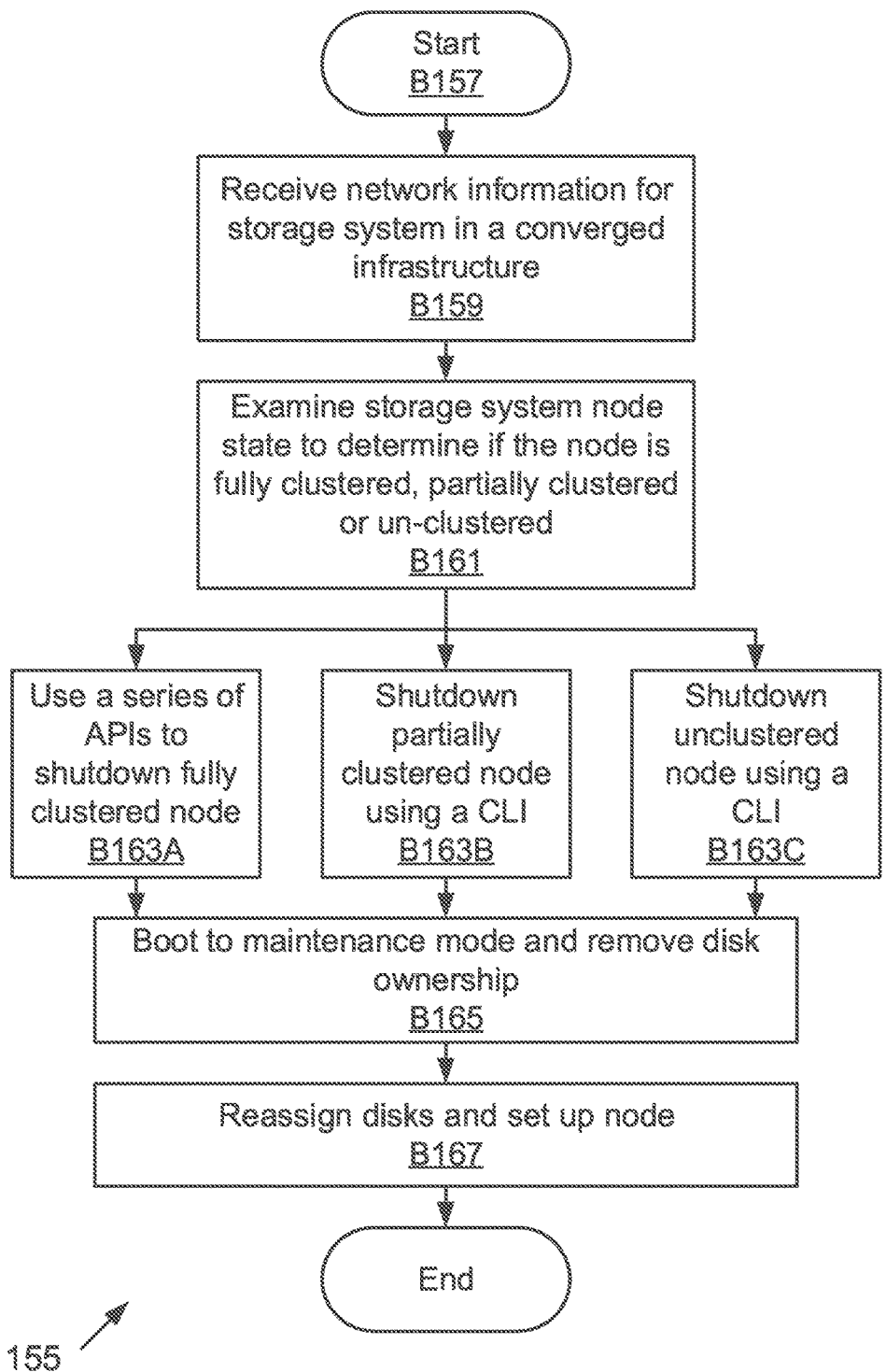

FIG. 1I shows a process 155 for executing a reset operation for a storage system 108 in a CI environment, according to one aspect of the present disclosure. Process 155 is executed when the storage system 108 is converted into a CI configuration and then has to be reset to a previous non-CI state. In another instance, process 155 is used when for example, a storage system hardware has been in use in a non-CI environment, the hardware is to be reconfigured to its factory state and then setup within a CI environment. Furthermore, process 155 may also be used, when one entity (e.g. department A of a business) is using a storage system hardware in a CI environment and another entity (department B) wants to use the hardware in the CI environment. Then process 155 is used to revert to the factory state before department B starts using the hardware in the CI environment. The process begins in block B157.

In block B159, network information for the storage system in a CI environment is received. This includes IP addresses, user name/password, cluster IP addresses and other information. This information may be retrieved by the configuration module 142 from data structure 148.

In block B161, the network information is used to connect to the storage system 108 node. The storage system node is examined to determine if the node is fully clustered, partially clustered or un-clustered. In a fully clustered system, the cluster has at least two nodes. In a partial cluster, when the cluster is created one node was successfully added to the cluster and a second node could not be added to the cluster (for any reason). An un-clustered system is a stand-alone system.

The storage system node is then shutdown based on its state. For example, in block B163A, a series of APIs are used to shut down the node, when the storage system node is in a fully clustered state. A CLI is used to shut down in block B163B, when the node is partially clustered. A CLI may also be used to shut down the node in block B163C, when the node is unclustered.

Thereafter, in block B165, the node is booted to a maintenance node and storage device ownership is removed in block B165 as described below with respect to FIG. 1J. The storage devices are then reassigned in block B167 and the process ends.

Figure 1J:
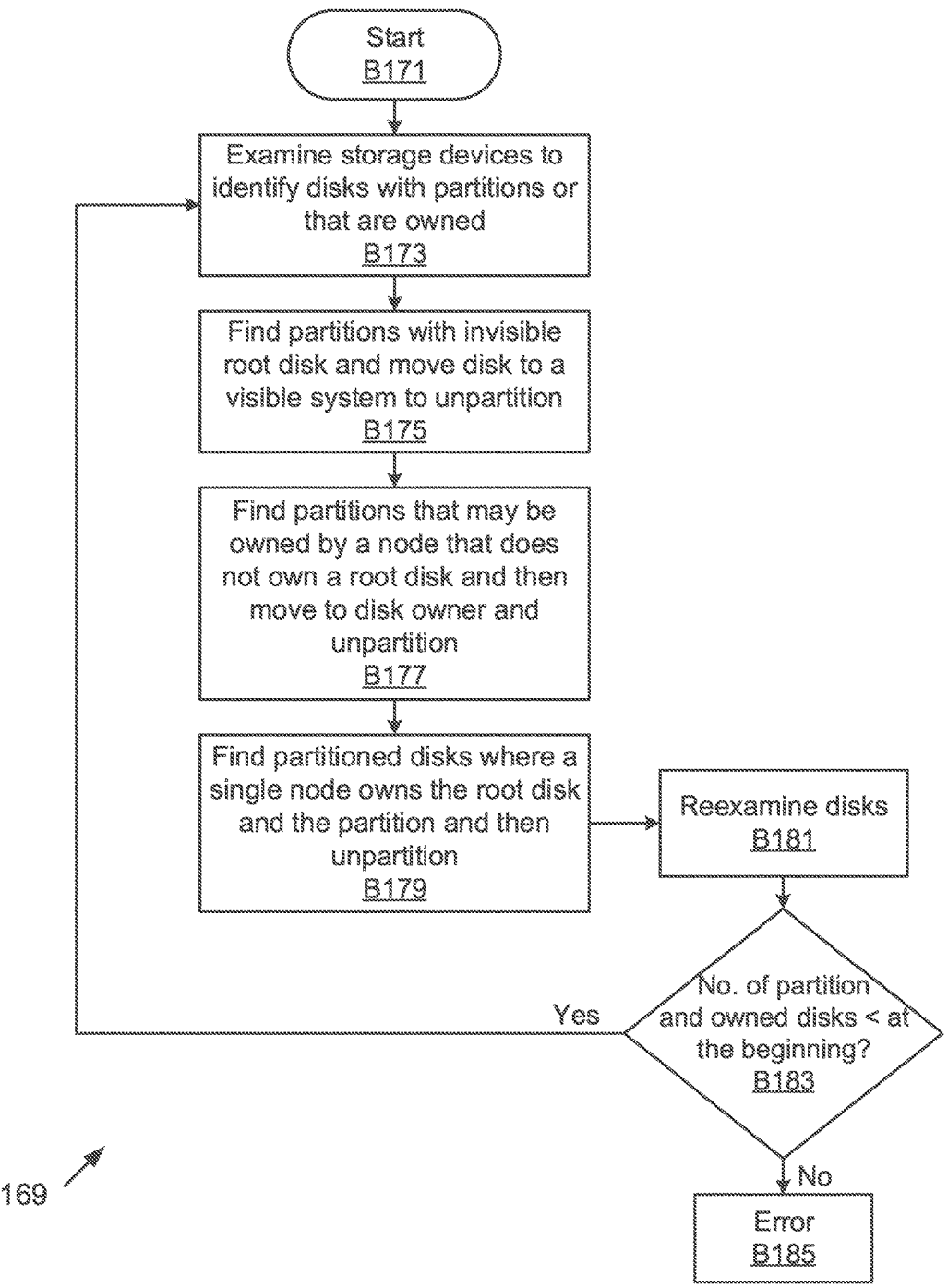

FIG. 1J shows a process 169 for removing storage device ownership during a reset operation, according to one aspect of the present disclosure. The process begins in block B171, when the reset operation has started as described above with respect to FIG. 1J and the process reaches block B165.

In block B173, the process examines the storage devices managed by the storage system node to determine storage devices that have partitions or are owned. This information is obtained from the storage operating system.

Blocks B175-181 are executed to find partitions on storage devices that are owned by no one, assign owners to partitions and then un-partition. In one aspect, the process interrogates each storage system node within the cluster to determine what storage devices the storage system node can see, the storage devices it owns and any partitions that the node may be aware of.

In block B175, the process first finds partitions with an invisible root disk. The invisible root disk partitions are moved to a visible system and then unpartitioned. In block B177, partitions that are owned by a system that does not own the root disk are identified. The partitions are moved to the root disk owner and then unpartitioned. In block B179, partitioned disks that are owned by a single node that also owns a root disk are identified and then un-partitioned.

In block B181, the storage devices are re-examined by the process. In block B183, the process determines if the number of partitioned and owned disks are less than the beginning i.e. B171, if yes, then the process reverts back to B173. In not, then an error is generated in block B185.

Figure 1K:
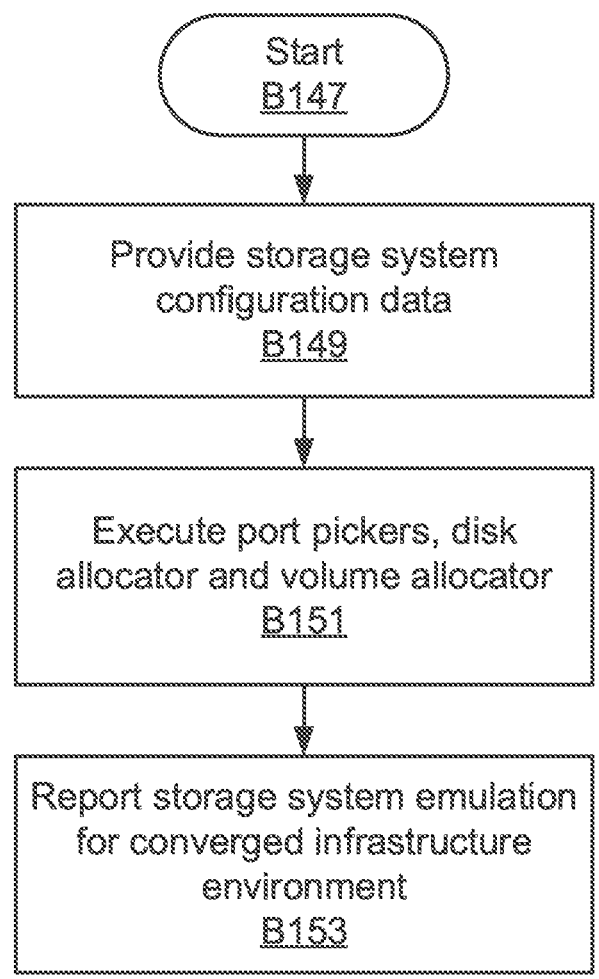

FIG. 1K shows a process 145 executed by the emulator 152, according to one aspect of the present disclosure. The process begins in B147, when a storage system 108 is identified. The storage system configuration data from data structure 148 is provided to the emulator 152 in block B149. Thereafter, the port picker module 150A, the disk allocator 150B and the volume allocator 150C are executed, as described above with respect to Figures FIG. 1F-1H. The emulator 152 presents a report in block B153 that provides information regarding the storage system if it is deployed in a CI environment.

Figure 2A:
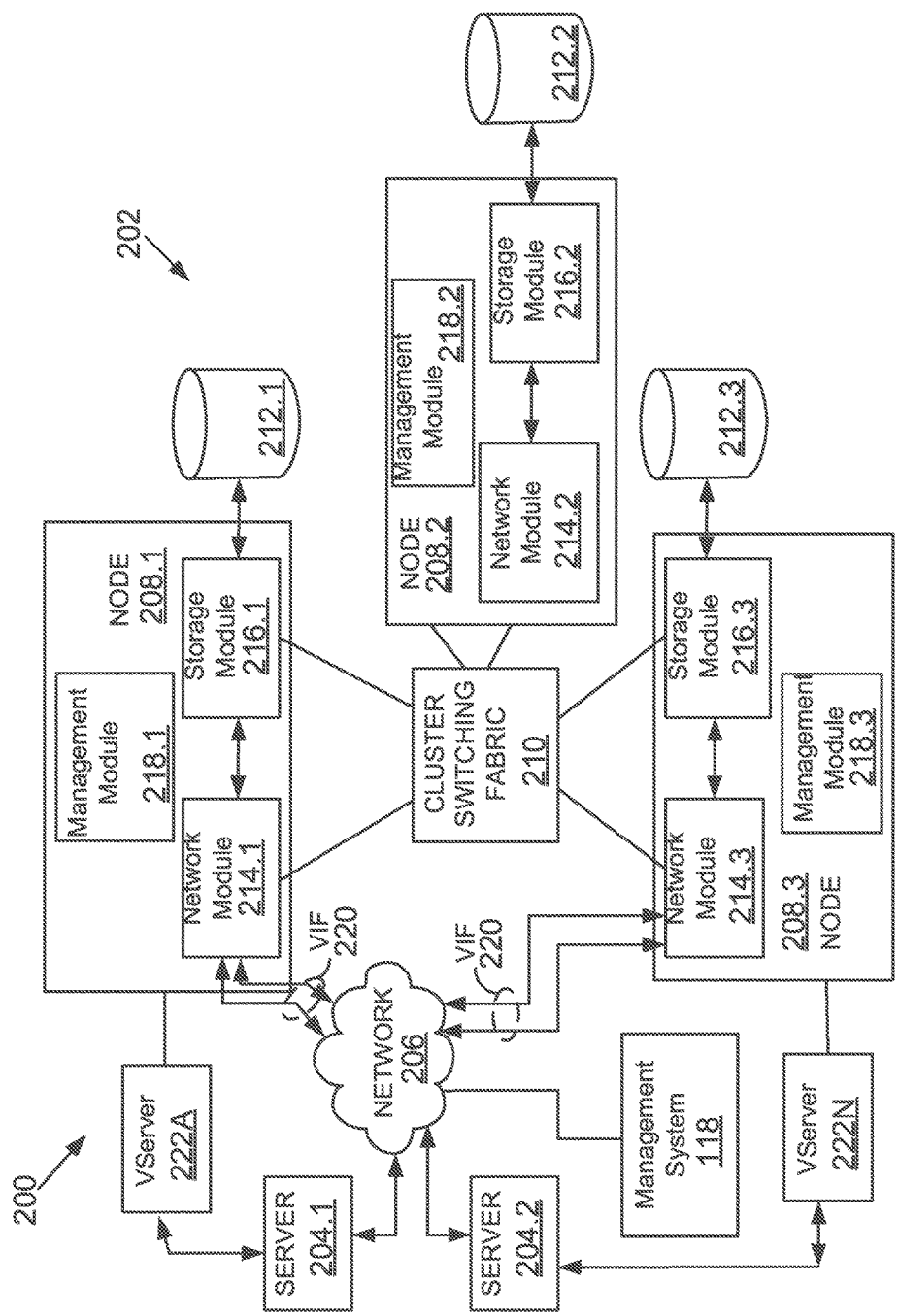
FIG. 2A shows an example of a clustered storage system that can be deployed within a converged infrastructure, according to one aspect of the present disclosure.
Figure 2B:
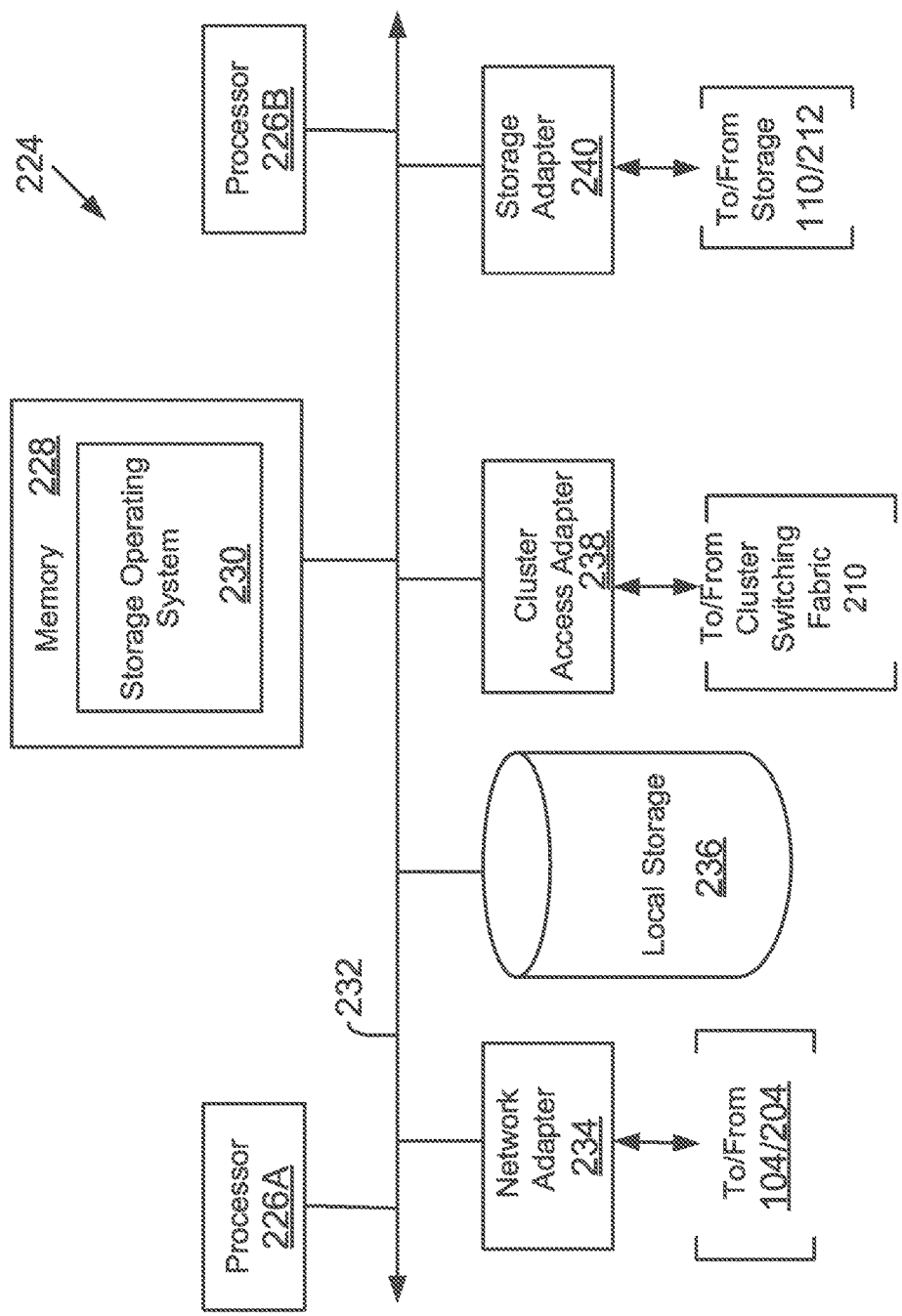
FIG. 2B shows an example of a storage system node within a clustered storage system, used according to one aspect of the present disclosure.

Clustered Storage System:

FIG. 2A depicts an illustrative aspect of a networked storage environment 200 including a plurality of server systems 204.1-204.2 (similar to server systems 104 and part of compute node 103), a clustered storage system 202 (part of storage solution 107) and at least one computer network 206 (part of networking node 105) communicably connecting the server systems 204.1-204.2 and the clustered storage system 202. Management system 118 is used to manage configuration information and perform configuration steps described above in detail.

As shown in FIG. 2A, the clustered storage system 202 includes a plurality of nodes 208.1-208.3, a cluster switching fabric 210, and a plurality of mass storage devices 212.1-212.3 (similar to 110/114, FIG. 1A).

Each of the plurality of nodes 208.1-208.3 are configured to include a network module, a storage module, and a management module, each of which can be implemented as a separate processor executable or machine implemented module. Specifically, node 208.1 includes a network module 214.1, a storage module 216.1, and a management module 218.1, node 208.2 includes a network module 214.2, a storage module 216.2, and a management module 218.2, and node 208.3 includes a network module 214.3, a storage module 216.3, and a management module 218.3.

The network modules 214.1-214.3 include functionality that enables the respective nodes 208.1-208.3 to connect to one or more of the client systems 204.1-204.2 over the computer network 206, while the storage modules 216.1-216.3 connect to one or more of the storage devices 212.1-212.3.

The management modules 218.1-218.3 provide management functions within the clustered storage system 202. Accordingly, each of the plurality of server nodes 208.1-208.3 in the clustered storage server arrangement provides the functionality of a storage server.

A switched virtualization layer including a plurality of virtual interfaces (VIFs) 220 is provided below the interface between the respective network modules 214.1-214.3 and the client systems 204.1-204.2, allowing storage 212.1-212.3 associated with the nodes 208.1-208.3 to be presented to the client systems 204.1-204.2 as a single shared storage pool. For example, the switched virtualization layer may implement a virtual interface architecture. FIG. 2A depicts only the VIFs 220 at the interfaces to the network modules 214.1, 214.3 for clarity of illustration.

The clustered storage system 202 can be organized into any suitable number of virtual servers (VServers or storage virtual machines (SVMs)) 222A-222N, in which each virtual storage system represents a single storage system namespace with separate network access. Each virtual storage system has a user domain and a security domain that are separate from the user and security domains of other virtual storage systems. Server systems 204 can access storage space via a VServer from any node of the clustered system 202.

Each of the nodes 208.1-208.3 may be defined as a computer adapted to provide application services to one or more of the client systems 204.1-204.2. In this context, a SVM is an instance of an application service provided to a client system. The nodes 208.1-208.3 are interconnected by the switching fabric 210, which, for example, may be embodied as a Gigabit Ethernet switch or any other switch type.

Although FIG. 2A depicts three network modules 214.1-214.3, the storage modules 216.1-216.3, and the management modules 218.1-218.3, any other suitable number of network modules, storage modules, and management modules may be provided. There may also be different numbers of network modules, storage modules, and/or management modules within the clustered storage system 202. For example, in alternative aspects, the clustered storage system 202 may include a plurality of network modules and a plurality of storage modules interconnected in a configuration that does not reflect a one-to-one correspondence between the network modules and storage modules.

The server systems 204.1-204.2 (similar to host 104) of FIG. 2A may be implemented as computing devices configured to interact with the respective nodes 208.1-208.3 in accordance with a client/server model of information delivery. In the presently disclosed aspect, the interaction between the server systems 204.1-204.2 and the nodes 208.1-208.3 enable the provision of network data storage services. Specifically, each server system 204.1, 204.2 may request the services of one of the respective nodes 208.1, 208.2, 208.3, and that node may return the results of the services requested by the client system by exchanging packets over the computer network 206, which may be wire-based, optical fiber, wireless, or any other suitable combination thereof. The server systems 204.1-204.2 may issue packets according to file-based access protocols, such as the NFS or CIFS protocol, when accessing information in the form of files and directories.

In a typical mode of operation, one of the server systems 204.1-204.2 transmits an NFS or CIFS request for data to one of the nodes 208.1-208.3 within the clustered storage system 202, and the VIF 220 associated with the respective node receives the client request. It is noted that each VIF 220 within the clustered system 202 is a network endpoint having an associated IP address. The server request typically includes a file handle for a data file stored in a specified volume on at storage 212.1-212.3.

Storage System Node:

FIG. 2B is a block diagram of a computing system 224, according to one aspect. System 224 may be used by a stand-alone storage system 108 and/or a storage system node operating within a cluster based storage system described above with respect to FIG. 2A.

System 224 may include a plurality of processors 226A and 226B, a memory 228, a network adapter 234, a cluster access adapter 238 (used for a cluster environment), a storage adapter 240 and local storage 236 interconnected by a system bus 232. The local storage 236 comprises one or more storage devices, such as disks, utilized by the processors to locally store configuration and other information.

The cluster access adapter 238 comprises a plurality of ports adapted to couple system 224 to other nodes of a cluster as described above with respect to FIG. 2A. In the illustrative aspect, Ethernet may be used as the clustering protocol and interconnect media, although it will be apparent to those skilled in the art that other types of protocols and interconnects may be utilized within the cluster architecture described herein.

System 224 is illustratively embodied as a dual processor storage system executing a storage operating system 230 that preferably implements a high-level module, such as a file system, to logically organize information as a hierarchical structure of named directories, files and special types of files called virtual disks (hereinafter generally "blocks") on storage devices 110/114/212. However, it will be apparent to those of ordinary skill in the art that the system 224 may alternatively comprise a single or more than two processor systems. Illustratively, one processor 226 executes the functions of a network module on a node, while the other processor 226B executes the functions of a storage module.

The memory 228 illustratively comprises storage locations that are addressable by the processors and adapters for storing programmable instructions and data structures. The processor and adapters may, in turn, comprise processing elements and/or logic circuitry configured to execute the programmable instructions and manipulate the data structures. It will be apparent to those skilled in the art that other processing and memory means, including various computer readable media, may be used for storing and executing program instructions described herein.

The storage operating system 230, portions of which is typically resident in memory and executed by the processing elements, functionally organizes the system 224 by, inter alia, invoking storage operations in support of the storage service provided by storage system 108. An example of operating system 230 is the DATA ONTAP® (Registered trademark of NetApp, Inc. operating system available from NetApp, Inc. that implements a Write Anywhere File Layout (WAFL® (Registered trademark of NetApp, Inc.)) file system. However, it is expressly contemplated that any appropriate storage operating system may be enhanced for use in accordance with the inventive principles described herein. As such, where the term "ONTAP" is employed, it should be taken broadly to refer to any storage operating system that is otherwise adaptable to the teachings of this invention.

The network adapter 234 comprises a plurality of ports adapted to couple the system 224 to one or more server systems over point-to-point links, wide area networks, virtual private networks implemented over a public network (Internet) or a shared local area network. The network adapter 234 thus may comprise the mechanical, electrical and signaling circuitry needed to connect storage system 108 to the network. Illustratively, the computer network may be embodied as an Ethernet network or a FC network. In one aspect, the network adapter 234 includes dedicated data ports for sending and receiving data. In another aspect, more than one network adapter is used, where one adapter is dedicated for data and another for management ports.

The storage adapter 240 cooperates with the storage operating system 230 executing on the system 224 to access information requested by the server systems 104 and management system 118 (FIG. 1A). The information may be stored on any type of attached array of writable storage device media such as video tape, optical, DVD, magnetic tape, bubble memory, electronic random access memory, flash memory devices, micro-electro mechanical and any other similar media adapted to store information, including data and parity information.

The storage adapter 240 comprises a plurality of ports having input/output (I/O) interface circuitry that couples to the disks over an I/O interconnect arrangement, such as a conventional high-performance, FC link topology.

In another aspect, instead of using a separate network and storage adapter, a converged adapter is used to process both network and storage traffic.

Figure 3:
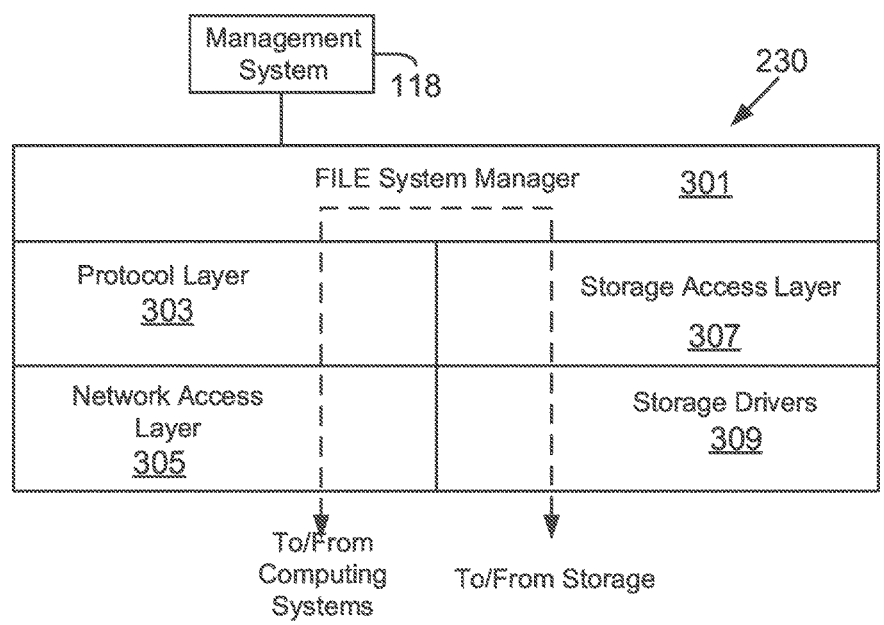
FIG. 3 shows an example of a storage operating system, used according to one aspect of the present disclosure.

Operating System:

FIG. 3 illustrates a generic example of operating system 230 executed by storage system 108, according to one aspect of the present disclosure. Storage operating system 230 interfaces with the management system 118 and provides information for data structure 148 maintained by the management system 118, described above in detail.

As an example, operating system 230 may include several modules, or "layers". These layers include a file system manager 303 that keeps track of a directory structure (hierarchy) of the data stored in storage devices and manages read/write operations, i.e. executes read/write operations on disks in response to server system 104 requests.

Operating system 230 may also include a protocol layer 303 and an associated network access layer 305, to allow system 200 to communicate over a network with other systems, such as server system 104 and management system 118. Protocol layer 303 may implement one or more of various higher-level network protocols, such as NFS, CIFS, Hypertext Transfer Protocol (HTTP), TCP/IP and others.

Network access layer 305 may include one or more drivers, which implement one or more lower-level protocols to communicate over the network, such as Ethernet. Interactions between server systems 104 and mass storage devices 110/114/212 are illustrated schematically as a path, which illustrates the flow of data through operating system 230.

The operating system 230 may also include a storage access layer 307 and an associated storage driver layer 309 to communicate with a storage device. The storage access layer 307 may implement a higher-level disk storage protocol, such as RAID (redundant array of inexpensive disks), while the storage driver layer 309 may implement a lower-level storage device access protocol, such as FC or SCSI.

It should be noted that the software "path" through the operating system layers described above needed to perform data storage access for a client request may alternatively be implemented in hardware. That is, in an alternate aspect of the disclosure, the storage access request data path may be implemented as logic circuitry embodied within a field programmable gate array (FPGA) or an ASIC. This type of hardware implementation increases the performance of the file service provided by storage system 108.

As used herein, the term "storage operating system" generally refers to the computer-executable code operable on a computer to perform a storage function that manages data access and may implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a stand-alone computer or portion thereof, embodied as or including a storage system. Moreover, the teachings of this disclosure can be adapted to a variety of storage system architectures including, but not limited to, a network-attached storage environment, a storage area network and a disk assembly directly-attached to a client or host computer. The term "storage system" should therefore be taken broadly to include such arrangements in addition to any subsystems configured to perform a storage function and associated with other equipment or systems.

Figure 4:
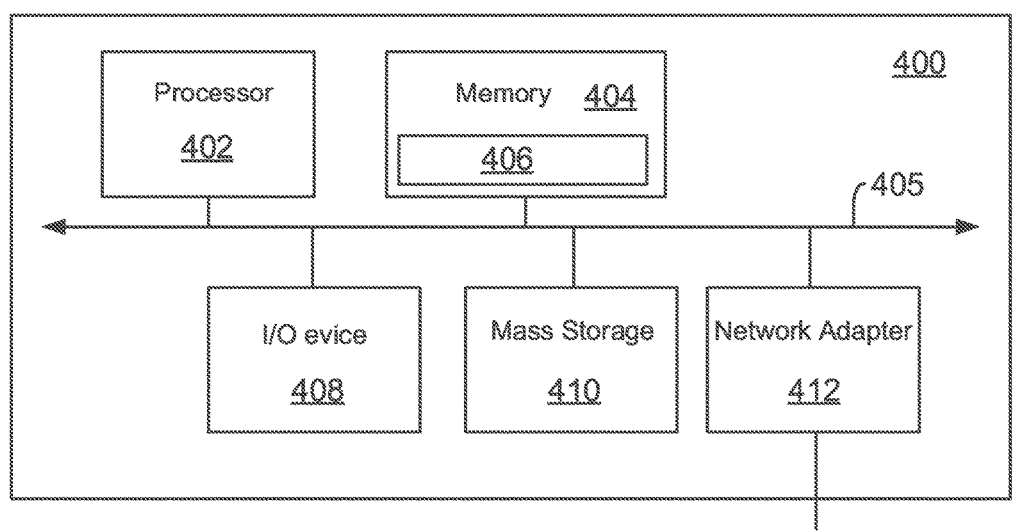
FIG. 4 shows an example of a processing system, used according to one aspect of the present disclosure.

Processing System:

FIG. 4 is a high-level block diagram showing an example of the architecture of a processing system, at a high level, in which executable instructions as described above can be implemented. The processing system 400 can represent modules of management system 118, user console 102, server systems 104, storage system 108 and others. Note that certain standard and well-known components which are not germane to the present invention are not shown in FIG. 4.

The processing system 400 includes one or more processors 402 and memory 404, coupled to a bus system 405. The bus system 405 shown in FIG. 4 is an abstraction that represents any one or more separate physical buses and/or point-to-point connections, connected by appropriate bridges, adapters and/or controllers. The bus system 405, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processors 402 are the central processing units (CPUs) of the processing system 400 and, thus, control its overall operation. In certain aspects, the processors 402 accomplish this by executing programmable instructions stored in memory 404. A processor 402 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 404 represents any form of random access memory (RAM), read-only memory (ROM), flash memory, or the like, or a combination of such devices. Memory 404 includes the main memory of the processing system 400. Instructions 406 which implements techniques introduced above may reside in and may be executed (by processors 402) from memory 404. For example, instructions 406 may include code used by emulator 152, validation module 140, acquisition module 144, configuration module 142, communication module 146 and GUI 136 as well as instructions for executing the process blocks of FIGS. 1D-1K.

Also connected to the processors 402 through the bus system 405 are one or more internal mass storage devices 410, and a network adapter 412. Internal mass storage devices 410 may be or may include any conventional medium for storing large volumes of data in a non-volatile manner, such as one or more magnetic or optical based disks. The network adapter 412 provides the processing system 400 with the ability to communicate with remote devices (e.g., storage servers) over a network and may be, for example, an Ethernet adapter, a FC adapter, or the like. The processing system 400 also includes one or more input/output (I/O) devices 408 coupled to the bus system 405. The I/O devices 408 may include, for example, a display device, a keyboard, a mouse, etc.

Cloud Computing:

The system and techniques described above are applicable and useful in the cloud computing environment. Cloud computing means computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to the Internet and cloud computing allows shared resources, for example, software and information to be available, on-demand, like a public utility.

Typical cloud computing providers deliver common business applications online which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud.

After the application layer, is a cloud platform and cloud infrastructure, followed by a "server" layer that includes hardware and computer software designed for cloud specific services. The management system 118 (and associated methods thereof) and storage systems described above can be a part of the server layer for providing storage services. Details regarding these layers are not germane to the inventive aspects.

Thus, a method and apparatus for a converged infrastructure have been described. Note that references throughout this specification to "one aspect" or "an aspect" mean that a particular feature, structure or characteristic described in connection with the aspect is included in at least one aspect of the present invention. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the present disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A method, comprising;
   determining by a processor that a storage system node of a converged infrastructure (CI) is to be reset from a first configuration to a second configuration; wherein the CI includes a compute node, a networking node and a storage solution deploying the storage system node;
   retrieving by the processor, network access information to connect to the storage system node;
   identifying by the processor a storage system node type;
   shutting down by the processor, the storage system node using a mechanism based on the storage system node type;
   re-booting by the processor, the storage system node and removing ownership of a storage device of the storage system node.

2. The method of claim 1, wherein an application programming interface is used to shut down the storage system node, when the storage system node is clustered indicating that a cluster has at least two nodes.

3. The method of claim 1, wherein a command line interface is used to shut down the storage system node, when the storage system node is un-clustered.

4. The method of claim 1, wherein to remove ownership, the processor removes a partition when the partition and a root disk are owned by a same node.

5. The method of claim 1, wherein to remove ownership, the processor removes a partition after moving the partition to a node that owns a root disk associated with the partition.

6. The method of claim 1, wherein the first configuration is based on a CI configuration and the second configuration is based on a non-CI state.

7. The method of claim 1, wherein the first configuration is based on a non-CI state and the second configuration is an initial state of the storage system node.

8. A non-transitory, machine readable storage medium having stored thereon instructions for performing a method, comprising machine executable code which when executed by at least one machine, causes the machine to:
   determine that a storage system node of a converged infrastructure (CI) is to be reset from a first configuration to a second configuration; wherein the CI includes a compute node, a networking node and a storage solution deploying the storage system node;
   retrieve network access information to connect to the storage system node;
   identify a storage system node type;
   shut down the storage system node using a mechanism based on the storage system node type;
   re-boot the storage system node and remove ownership of a storage device of the storage system node.

9. The storage medium of claim 8, wherein an application programming interface is used to shut down the storage system node, when the storage system node is clustered indicating that a cluster has at least two nodes.

10. The storage medium of claim 8, wherein a command line interface is used to shut down the storage system node, when the storage system node is un-clustered.

11. The storage medium of claim 8, wherein to remove ownership, a partition is removed when the partition and a root disk are owned by a same node.

12. The storage medium of claim 8, wherein to remove ownership, a partition is removed after moving the partition to a node that owns a root disk associated with the partition.

13. The storage medium of claim 8, wherein the first configuration is based on a CI configuration and the second configuration is based on a non-CI state.

14. The storage medium of claim 8, wherein the first configuration is based on a non-CI state and the second configuration is an initial state of the storage system node.

15. A system, comprising:
   a memory containing machine readable medium comprising machine executable code having stored thereon instructions; and a processor module of a management device coupled to the memory, the processor module configured to execute the machine executable code to:
   determine that a storage system node of a converged infrastructure (CI) is to be reset from a first configuration to a second configuration; wherein the CI includes a compute node, a networking node and a storage solution deploying the storage system node;
   retrieve network access information to connect to the storage system node;
   identify a storage system node type;
   shut down the storage system node using a mechanism based on the storage system node type;
   re-boot the storage system node and remove ownership of a storage device of the storage system node.

16. The system of claim 15, wherein an application programming interface is used to shut down the storage system node, when the storage system node is clustered indicating that a cluster has at least two nodes.

17. The system of claim 15, wherein a command line interface is used to shut down the storage system node, when the storage system node is un-clustered.

18. The system of claim 15, wherein to remove ownership, a partition is removed when the partition and a root disk are owned by a same node.

19. The system of claim 15, wherein to remove ownership, a partition is removed after moving the partition to a node that owns a root disk associated with the partition.

20. The system of claim 15, wherein the first configuration is based on a CI configuration and the second configuration is based on a non-CI state.

* * * * *